United States Patent [19]
Honda et al.

[11] Patent Number: 5,609,217
[45] Date of Patent: Mar. 11, 1997

[54] CONSTANT-SPEED CRUISE CONTROL APPARATUS FOR A VEHICLE

[75] Inventors: Toshiya Honda, Okazaki; Yoshinari Torii, Gamagori, both of Japan

[73] Assignee: Nippondenso Co., Ltd., Kariya, Japan

[21] Appl. No.: 451,142

[22] Filed: May 26, 1995

[30] Foreign Application Priority Data

May 26, 1994 [JP] Japan .................................. 6-112780

[51] Int. Cl.⁶ ................................................. B60K 31/00
[52] U.S. Cl. ................................................................ 180/170
[58] Field of Search ................................. 180/179, 178, 180/177, 176, 171, 170

[56] References Cited

U.S. PATENT DOCUMENTS 5,329,454  7/1994  Takada et al. ....................... 364/426.04
5,524,724  6/1996  Nishigaki et al. ....................... 180/176

FOREIGN PATENT DOCUMENTS 60-500317  3/1985  Japan .
62-64637   3/1987  Japan .
274423     3/1990  Japan .
4278836    10/1992 Japan .
577656     3/1993  Japan .

Primary Examiner—Richard M. Camby
Assistant Examiner—Frank Vanaman
Attorney, Agent, or Firm—Cushman, Darby & Cushman

[57] ABSTRACT

Engine-racing control is performed in which a throttle valve is temporarily driven to the open side at start of cruise control. The engine-racing control is forcibly stopped when skip vehicle speed Vsk serving as an estimated vehicle speed after a predetermined time becomes higher than storage vehicle speed (target traveling speed) Vm. For example, on a downward slope where a vehicle is naturally accelerated due to gravitational acceleration, the vehicle is excessively accelerated due to the engine-racing control same as that on a flat road. However, because the behavior of the vehicle on the downward slope is reflected on the skip vehicle speed Vsk, it is possible to stop the engine-racing control early compared to the case in which the vehicle travels on the flat road and to avoid excessive acceleration.

8 Claims, 7 Drawing Sheets

CONSTANT-SPEED CRUISE CONTROL APPARATUS FOR A VEHICLE

CROSS REFERENCE TO RELATED APPLICATION

This application is based upon and claims priority from Japanese Patent Application No. Hei. 6-112780 filed May 26, 1994, the contents of which are incorporated herein by reference.

BACKGROUND OF THE INVENTION

1. Field of the Invention

The present invention relates to a constant-speed cruise control apparatus for a vehicle, particularly to a constant-speed cruise control apparatus for a vehicle for performing "acceleration correction", i.e., what is called "engine-racing control" corresponding to a road condition.

2. Description of the Related Art

A constant-speed cruise control apparatus for a vehicle has been known so far. When a driver steps on an accelerator to accelerate a vehicle up to a desired speed and thereafter operates a cruising-speed setting switch, the then vehicle speed is set as a cruising speed. Thereafter, the vehicle travels at a constant speed so as to decrease the deviation between the actual vehicle speed and the set vehicle speed to zero by, for example, adjusting the opening degree of a throttle. In the case of a vehicle mounting the apparatus, it is unnecessary for the driver to always step on the accelerator when traveling on a highway at a constant speed. Therefore, the apparatus is very convenient.

However, a phenomenon has occurred so far that the actual traveling speed of the vehicle temporarily decreases after the vehicle speed setting switch is operated and, after a while, the vehicle recovers a target speed. This is because the timing for the accelerator release operation by the driver is too early for the operation of the vehicle speed setting switch, a predetermined time is required for the arithmetic processing by control means after the vehicle speed setting switch is operated, or a delay time is present from the time when a driving signal is output to an actuator to the time when the actuator actually drives a speed adjustment element.

To reduce the drop of the traveling speed when starting the above cruise control, an art is known which performs compensation control known as "engine-racing control" by outputting a driving signal for temporarily driving a speed adjustment element to the acceleration side (e.g., driving a throttle valve toward a further opening position) at the start of cruise control as disclosed in Japanese Patent Publication No. Hei. 3-56926. For example, even if the timing for the accelerator release operation by a driver is too early for the command operation of cruise control, it is possible to reduce the drop of a traveling speed because the speed adjustment element is forcibly driven to the acceleration side and improve the vehicle-driving feeling when cruise control is started.

In the case of the "engine-racing control" according to the prior art, however, a driving signal (hereinafter referred to as an acceleration signal) for driving a speed adjustment element to the acceleration side is output to an actuator whenever cruise control is started. Therefore, even when a vehicle travels on a downward slope, the acceleration signal is output. Thus, under the state in which a vehicle is naturally accelerated due to the gravitational acceleration, a throttle excessively opens and the vehicle speed exceeds a target speed, and thereby the problem occurs that the driving feeling is impaired or the comfort deteriorates due to acceleration unexpected by the driver.

Moreover, the driving feeling is impaired not only at the start of cruise control but also during the control. For example, while cruise control is performed, the driver may step on the accelerator to temporarily increase the speed in order to outrun another vehicle. In this case, the vehicle speed is increased against the cruise control. While the above acceleration is performed, a control apparatus for performing cruise control controls a driving-force adjustment system so that the driving force decreases in order to return the vehicle speed to a target speed. Therefore, when the driver releases the accelerator, the so-called undershoot occurs in which the speed excessively decreases below the target speed.

To solve the above problem, an apparatus is known which performs a kind of "engine-racing control" in which the throttle opening degree is set to a previous cruise value at least before vehicle speed returns to a target speed after temporary acceleration is completed (Japanese Patent Laid-Open No. Hei. 4-278836). Also in the case of this art, however, the throttle opening degree is set to a previous cruise value before the vehicle speed returns to a target speed after temporary acceleration is completed even on a downward slope because the case in which a vehicle travels on a flat road is not distinguished from the case in which the vehicle travels on a downward slope. Therefore, for example, on a downward slope where a vehicle is naturally accelerated due to gravitational acceleration, the problem also occurs that vehicle speed is excessively increased from a target speed and thereby the driving feeling is impaired or the comfort deteriorates.

SUMMARY OF THE INVENTION

Therefore, it is an object of the present invention to provide a constant-speed cruise control apparatus for a vehicle making it possible to further improve the driving feeling and the comfortableness by performing the optimum "engine-racing control" corresponding to a road condition even on a downward slope where vehicle speed is naturally increased and thereby preventing the vehicle speed from excessively increasing from a target speed.

To attain the above object, at the time of cruise control, driving-force control means controls a driving-force adjustment system for adjusting the driving force of an engine so as to adjust a vehicle speed detected by vehicle speed detection means to a target traveling speed in accordance with the deviation between the detected vehicle speed and the target traveling speed and acceleration correction means temporarily drives the driving-force adjustment system to the acceleration side (e.g., drives a throttle valve toward a further opening position) under a condition.

The acceleration correction is frequently performed, for example, when cruise control is started or when temporary acceleration is performed during cruise control and thereafter cruising is restarted at a target traveling speed. In the case of the start of the cruise control, this is because the timing for the accelerator release operation by a driver is too early for the operation of a vehicle speed setting switch, a predetermined time is required for arithmetic processing by control means after the vehicle speed setting switch is operated, or a delay time is present from the time when a driving signal is output to an actuator to the time when the actuator actually drives a speed adjustment element. Furthermore, the most important reason to perform the acceleration correction is as follows. In the constant-speed cruise control, since the actuator drives the speed adjustment element responsive to the difference between the present vehicle speed and target vehicle speed, if the difference does not generate, the actuator does not drive the speed adjustment element to the acceleration side. In the case of the start of the cruise control, a driver operates the accelerator pedal to increase the vehicle speed to a desired target speed. Therefore, the difference between the present vehicle speed and the target vehicle speed does not generate and thereby the actuator does not drive the speed adjustment element to the acceleration side. Thereafter, when the driver releases the depression of the accelerator pedal, the vehicle speed drops. The difference generates due to the drop of the vehicle speed and therefore the actuator drives the speed adjustment element to the acceleration side. Consequently, there is delay before the actuator drives the speed adjustment element, as a result of the delay, the vehicle speed drops momentarily.

Moreover, according to the control apparatus of the present invention, the same acceleration correction is not always performed even under the above condition at the start of the cruise control. That is, acceleration correction stop means compares a comparative vehicle speed calculated based on a vehicle speed detected by vehicle speed detection means with a target traveling speed and stops the temporary driving of the driving-force adjustment system to the acceleration side by the acceleration correction means when the comparative vehicle speed is higher than the target traveling speed.

On a downward slope where a vehicle is naturally accelerated due to gravitational acceleration, the driving-force adjustment system is excessively driven to the acceleration side when acceleration correction same as that on a flat road is performed. However, the present invention compares a comparative vehicle speed which is based on a traveling vehicle speed with a target traveling speed and stops the temporary driving of the driving-force adjustment system to the acceleration side by the acceleration correction means when the comparative vehicle speed is higher than the target traveling speed. Therefore, it is possible to prevent the driving feeling from being impaired or the comfort from deteriorating due to a vehicle speed exceeding a target speed.

A vehicle is naturally accelerated due to gravitational acceleration on a downward slope. However, because the result of the acceleration of the vehicle is reflected on a comparative vehicle speed which is based on a detected traveling vehicle speed, the timing in which the comparative vehicle speed becomes higher than the target traveling speed early occurs compared to the case in which the vehicle travels on a flat road. Therefore, it is possible to stop acceleration correction early and avoid excessive acceleration.

Of course, even for the acceleration correction to be performed not only at the start of cruise control but also before a vehicle speed returns to a target vehicle speed after temporary acceleration is completed, the timing in which a comparative vehicle speed becomes higher than a target traveling speed also occurs. Therefore, it is possible to stop the acceleration correction early and prevent the driving feeling from being impaired or the comfort from deteriorating due to a vehicle speed exceeding a target speed. Moreover, it is possible to perform the same acceleration correction in order to prevent an undershoot after deceleration control.

Therefore, it is possible to prevent a vehicle speed from greatly increasing from a target speed by performing "acceleration correction" properly corresponding to even the difference between road conditions influencing the behavior of a vehicle and further improve the driving feeling and the comfort.

Moreover, it is possible to provide advanced vehicle speed calculation means which calculates an advanced vehicle speed based on the vehicle speed detected by vehicle speed detection means, whose phase advances relative that of the vehicle, and compare the calculated advanced vehicle speed with a target traveling speed. When performing the same acceleration correction on a flat road and a downward slope, a difference occurs between detected vehicle speeds. That is, the vehicle speed on the downward slope earlier exceeds the target traveling speed. However, by using the advanced vehicle speed, the difference further increases and it is possible to more securely decide a state in which stopping of acceleration correction is necessary. Therefore, it is possible to more securely avoid excessive acceleration.

Moreover, the driving-force control means can use means for adjusting driving force of an engine by using a previously-set map showing the relation between a deviation of vehicle speed from target traveling speed and an adjustment value or adjustment speed and in accordance with the adjustment value or adjustment speed obtained from the deviation.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

An embodiment of the present invention is described below by referring to the accompanying drawings.

Figure 1:
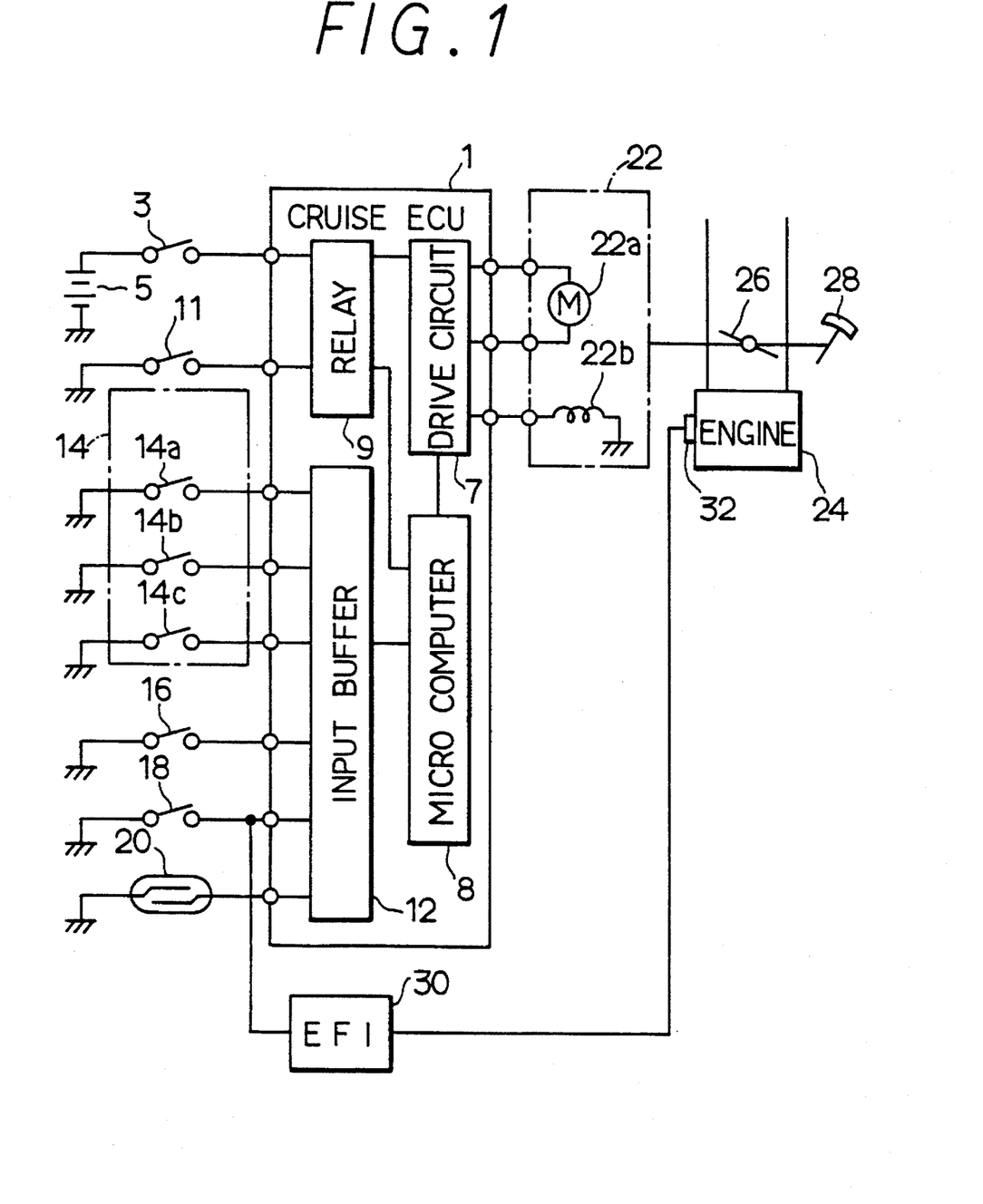
FIG. 1 is a block diagram of the whole cruise control apparatus of an embodiment of the present invention.

FIG. 1 shows a block diagram of the whole cruise control apparatus of the embodiment. The cruise control apparatus is mounted on a vehicle having a gasoline engine together with an electronic control fuel injection system EFI.

A cruise ECU 1 for performing cruise control connects with a battery 5 through an ignition switch 3. By turning on the ignition switch 3, power is supplied to the cruise ECU 1 and thereby a microcomputer 8 can be operated. Moreover, power is supplied to an actuator driving circuit 7 built in the cruising ECU 1.through a main relay 9. The main relay 9 connects with a main switch 11 for cruise control. By turning on the main switch 11, the main relay 9 is turned on and thereby, power is supplied to the actuator driving circuit 7 and the actuator driving circuit 7 can be operated.

The microcomputer 8 is a normal microcomputer provided with a ROM, a RAM, an I/O, a bus line, and the like. The microcomputer 8 receives signals from various sensors and switches through an input buffer 12. In the case of this embodiment, the microcomputer 8 receives signals from a control switch 14 for cruise control, a stop lamp switch 16 to be turned on when a driver steps on a brake pedal, an idle switch 18 to be turned on when a throttle is fully closed, and a vehicle speed sensor 20 (vehicle speed detection means) for generating a signal with a frequency proportional to a vehicle speed. The control switch 14 is provided with a set switch 14a, a resume switch 14b, and a cancel switch 14c. The set switch 14a, resume switch 14b, and cancel switch 14c are turned on only while they are pressed and immediately turned off when they are released.

The microcomputer 8 sequentially executes program instructions stored in the ROM in accordance with the signals output from these various sensors and switches and outputs a driving signal to the actuator driving circuit 7 when necessary.

The actuator driving circuit 7 drives an actuator 22 and sends a driving output corresponding to a driving signal sent from the microcomputer 8 to a motor 22a and a clutch 22b set in the actuator 22 in accordance with the driving signal. For example, the motor 22a is rotated normally or reversely and its rotation speed is controlled by the driving output sent from the actuator driving circuit 7. When the clutch 22b is turned on by the driving output sent from the actuator driving circuit 7, the rotation of the motor 22a is transmitted to a throttle valve 26 of an engine 24. Thereby, the microcomputer 8 can adjust the driving force of the engine 24 and thereby control vehicle speed.

As a generally known structure, an accelerator 28 is connected with the throttle valve 26 so that the throttle opening degree changes correspondingly to an accelerator 28 depression depth. Depressing the accelerator 28 and rotating the motor 22a connected to the throttle valve 26 by the clutch 22b can be performed independently of each other. However, the opening degree of the throttle valve 26 follows the larger one of the throttle opening degrees due to each operation.

Therefore, even if the motor 22a rotates so as to fully close the throttle valve 26, the throttle valve 26 has a throttle opening degree corresponding to the accelerator 28 depression depth when the accelerator 28 is depressed. However, when the motor 22a rotates so as to open the throttle valve 26 even if the accelerator 28 is not depressed, the throttle valve 26 has an opening degree corresponding to the rotation of the motor 22a. Because this structure is well known, detailed description of it is omitted.

In addition to the above-mentioned cruise control apparatus, an electronic control fuel injection system (EFI) 30 is included. The electronic control fuel injection system 30 computes the necessary amount of fuel corresponding to the load or the like of the engine 24 and injects fuel into an intake pipe from an injector 32. Moreover, the electronic control fuel injection system 30 performs fuel cutting control under a predetermined condition, that is, under the condition that the idle switch 18 is turned on during traveling and this state continues for a predetermined time (e.g. 500 msec).

Then, the cruise control processing to be executed by the microcomputer 8 is described below by referring to the flow charts in and after FIG. 2.

Figure 2:
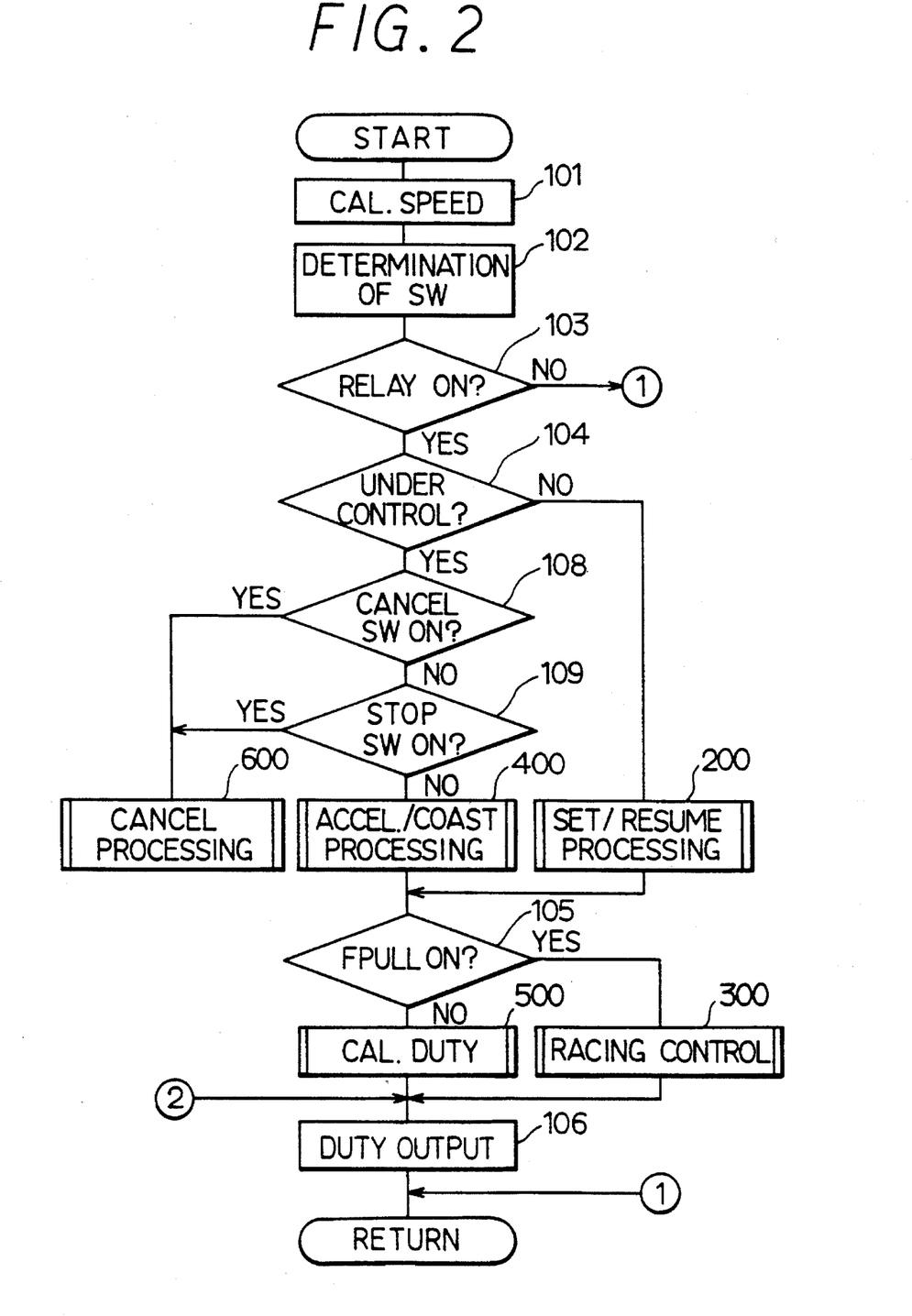
FIG. 2 is a flow chart of the cruise control processing performed by the cruise control apparatus.

The cruise control processing shown in FIG. 2 is performed every control cycle T (e.g. 48 msec) after power is supplied to the microcomputer 8 of the cruising ECU 1 by turning on an ignition switch 3. In this processing, an output duty cycle (%) is obtained from a computed vehicle speed and a switch input, and power is supplied to the motor 22a of the actuator 22 for the period of [T×duty /100].

First, the cycle of the vehicle speed sensor 20 is read to calculate the present vehicle speed (vehicle speed: Vn) (step 101). Then, it is decided whether inputs of the control switch 14, stop lamp switch 16, and idle switch 18 are turned on or off respectively (step 102). Then, it is decided whether the main relay 9 is turned on (step 103). This is performed so that cruise control cannot be started because power is not supplied to the actuator driving circuit 7 when the main relay 9 is not turned on. When the main relay 9 is not turned on, the program terminates without performing the processing such as duty arithmetic and waits until the next control cycle.

When the main relay 9 is turned on, it is decided whether cruise control is performed or not (step 104). In this processing downward, control to be executed is decided in accordance with the input data of the control switch 14.

When it is decided in step 104 that cruise control is not performed, the set-resume processing is executed (step 200). This processing decides whether cruise control is set. In this case, "setting" is to start cruise control by inputting the vehicle speed Vn when the set switch 14a is pressed while cruise control is not performed and setting the vehicle speed Vn to the target vehicle speed Vt and storage vehicle speed Vm.

Figure 3:
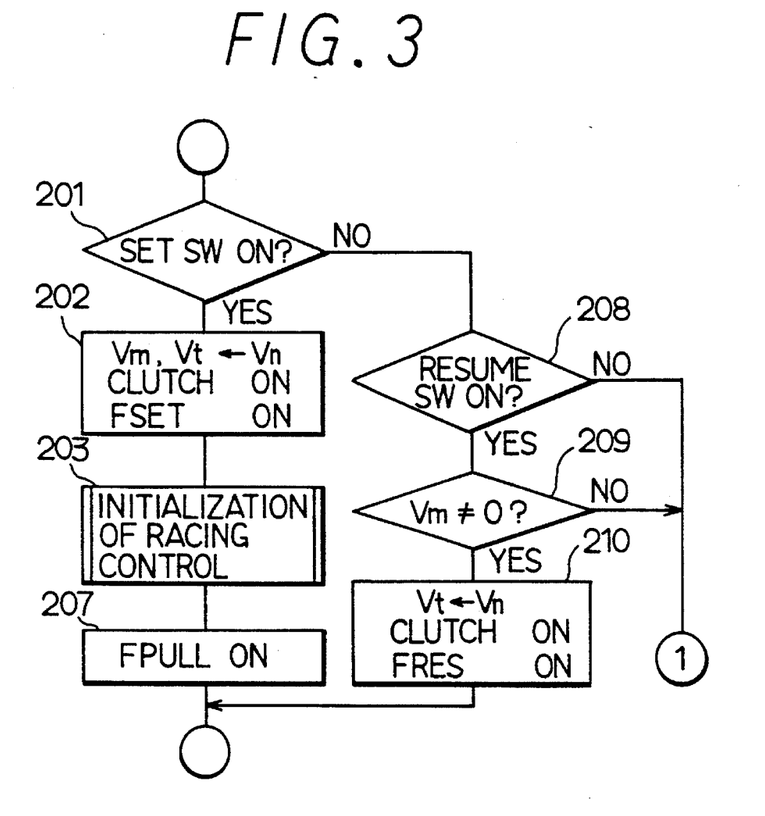
FIG. 3 is a flow chart showing the set-resume processing in the flow chart of FIG. 2.

FIG. 3 shows the set-resume processing (step 200) in detail. First, it is decided whether the set switch 14a is turned on (step 201). When the set switch 14a is turned on, the vehicle speed Vn computed in the preceding step 101 is set to the target vehicle speed Vt which is initially stored as the storage vehicle speed Vm and the clutch 22b is turned on so as to interlock the rotation of the motor 22a with the throttle valve 26. Moreover, a set flag FSET is turned on (step 202). Furthermore, the initialization processing of engine-racing control for preventing the vehicle speed when cruise control is set from dropping (step 203).

Drop of vehicle speed at the time of setting is caused by the motor 22a of the actuator 22 is normally at the fully closed position immediately after setting and a delay occurs when the motor 22a rotates from the position up to a throttle opening degree at which cruise control can be performed. To prevent the drop, the motor 22a of the actuator 22 is temporarily driven to the open side by a certain driving value immediately after setting. The engine-racing initialization processing for setting is performed to calculate the above driving value (step 203).

Figure 4:
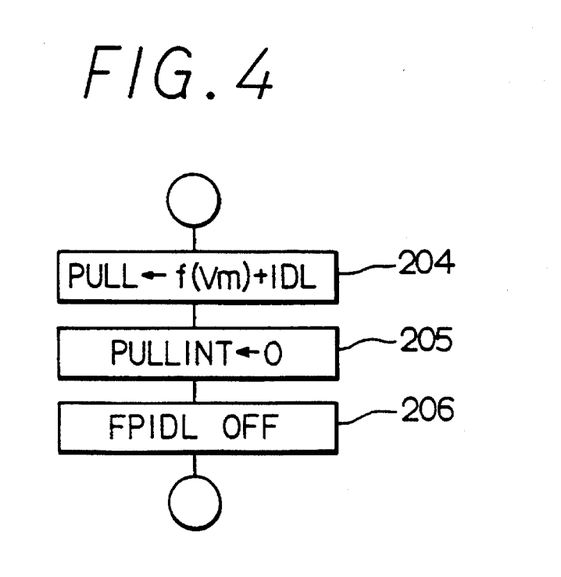
FIG. 4 is a flow chart showing the accelerator-coast processing in the flow chart of FIG. 3.

FIG. 4 shows a detailed flow chart of the engine-racing initialization processing (step 203) for setting. First, the driving value PULL required to drive the motor 22a to the open side is shown by the expression 1 below and calculated as the sum of a value f(Vm) obtained as the function of the storage vehicle speed Vm and a predetermined value IDL (step 204).

PULL←f(Vm)+IDL (Expression 1)

The predetermined value IDL corresponds to the play of a linkage of the actuator 22 or that of a throttle linkage.

Then, a value PULLINT to be mentioned later is zero-cleared (step 205) and moreover a flag FPIDL to be mentioned later is turned off (step 206) to complete the engine-racing initialization processing for setting (step 203). Then, a flag FPULL representing that engine-racing control is currently performed is turned on (step 207). Therefore, in the next decision on whether engine-racing control is currently performed, that is, in the decision on whether flag FPULL is turned on (step 105), affirmative decision is made and engine-racing control is executed (step 300).

Figure 5:
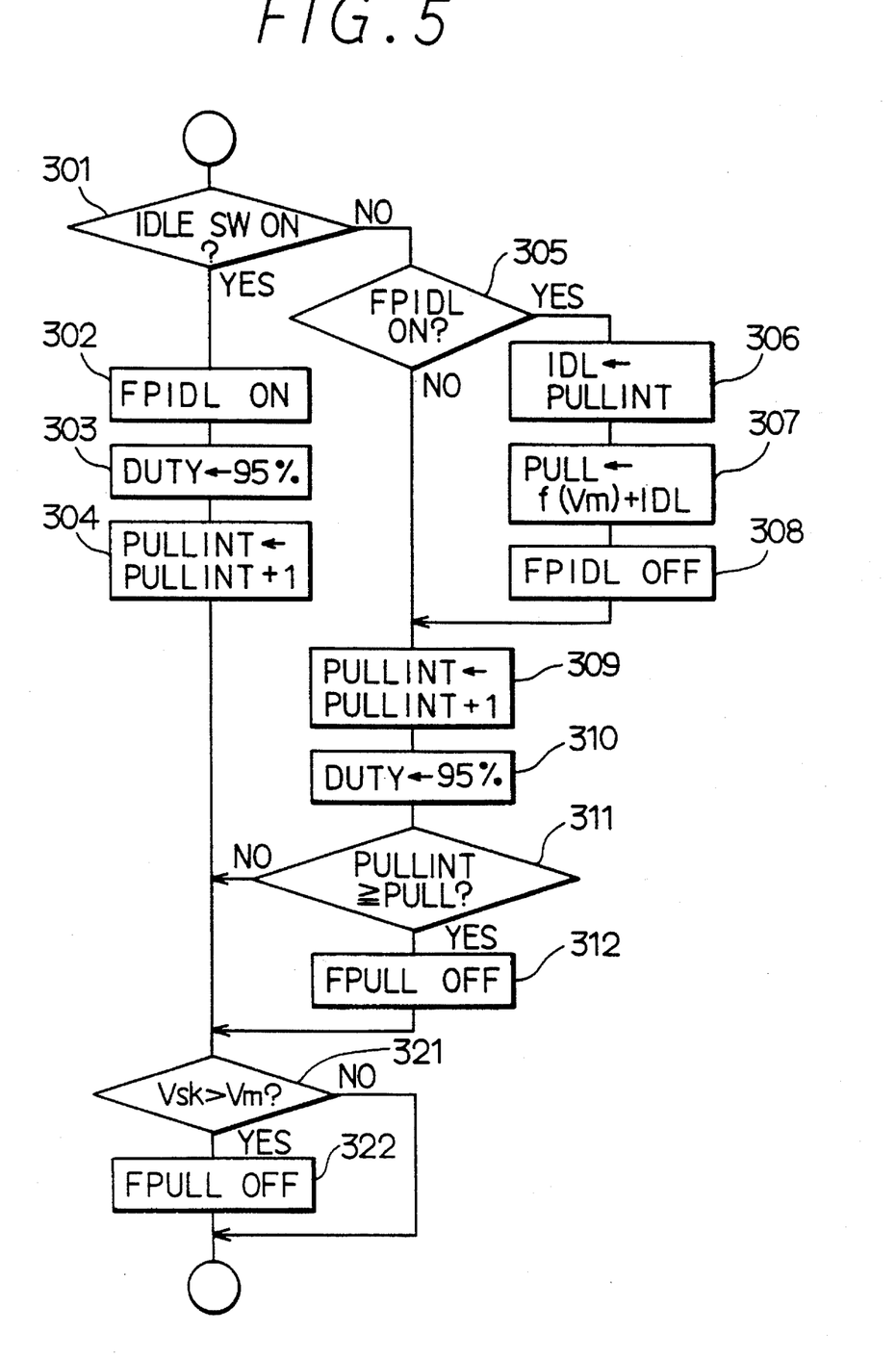
FIG. 5 is a flow chart showing the engine-racing initialization processing for setting in the flow chart of FIG. 2.

FIG. 5 shows details of the "engine-racing control". The fact that the idle switch 18 is turned on when cruise control is set in the processing in step 200 (see FIG. 2) represents that the present opening degree of the motor 22a of the actuator 22 is still at the position of play and the throttle valve 26 is at the fully closed position.

Therefore, as shown in FIG. 5, decision on whether the idle switch 18 is turned on is first made (step 301). When the switch 18 is turned on, a flag FPIDL showing that it is detected that the idle switch 18 is turned on under engine-racing control is turned on (step 302) and then, a fixed duty cycle (e.g. duty cycle of 95% for high-speed driving) is changed to an output duty so that the actuator 22 rotates at a high speed to the open side (step 303). Moreover, in this case, the number of output fixed duty cycles is counted by a counter PULLINT (step 304). Therefore, in the duty output processing shown in FIG. 2 (step 106), the motor 22a rotates at a high speed to the open side at a duty cycle of, for example, 95% and the rotation equivalent to the play is quickly canceled.

When processing is restarted with step 101 in the next control cycle, steps 102 and 103 are executed, and thereafter affirmative decision is made in step 104 because cruise control is currently performed and it is decided whether the cancel switch 14 is turned on (step 108) and the stop lamp switch 16 is turned on (step 109). However, because both switches are turned off, a negative decision is made and the accelerator-coast processing (step 400) is started.

Figure 6:
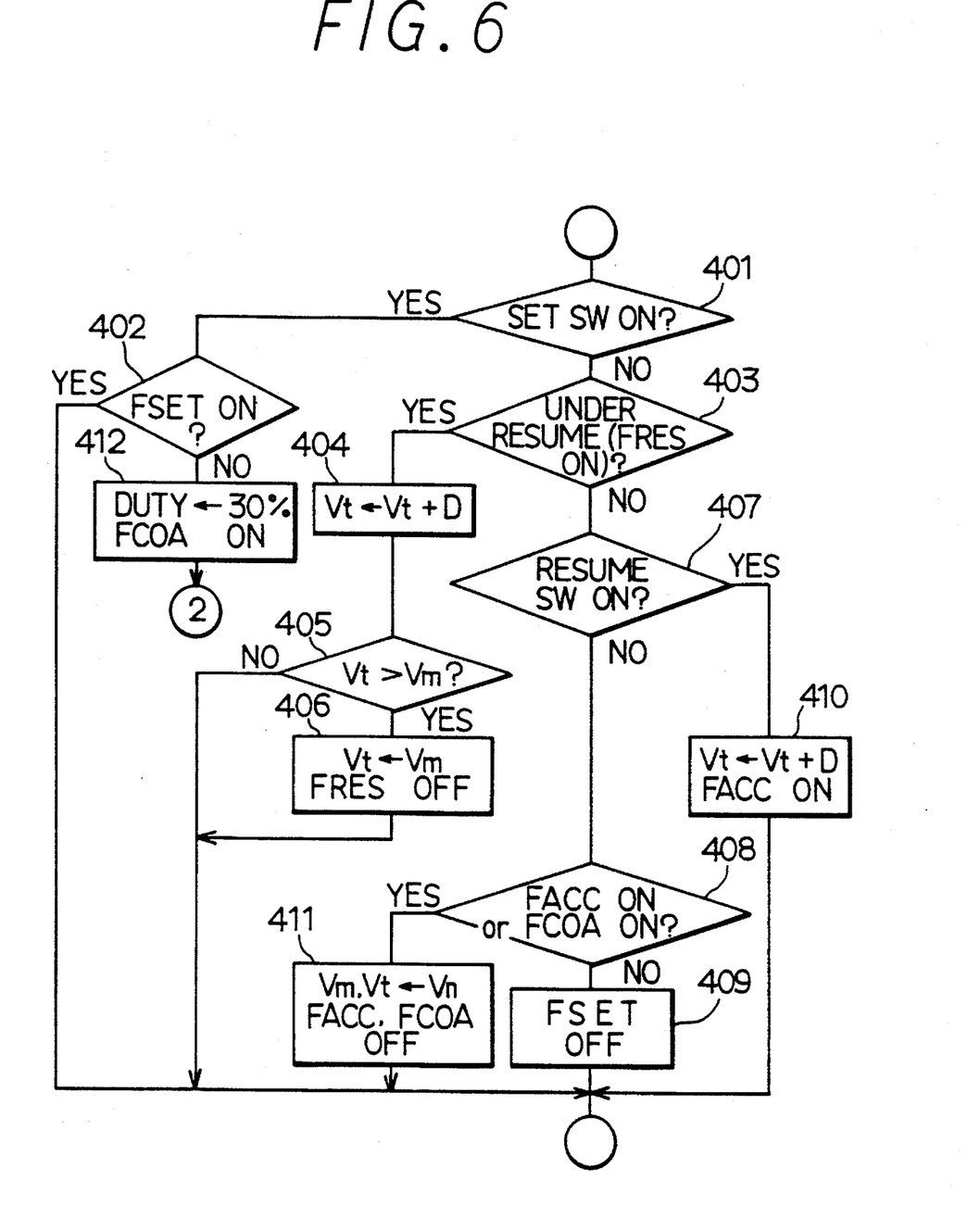
FIG. 6 is a flow chart showing the engine-racing control in the flow chart of FIG. 2.

FIG. 6 shows details of the accelerator-coast processing (step 400). First, it is decided whether the set switch 14a is turned on (step 401). When the switch 14a is turned on, it is decided whether the set flag FSET is turned on (step 402). Because the set flag FSET is already turned on in step 202 for the set-resume processing, affirmative decision is made in step 402 and the processing in step 105 is started. Because the flag FPULL is turned on, processing progresses from step 105 to step 300 and the processing in step 300 is executed again.

When a negative decision that the set switch 14a is not pressed is made in step 401, it is decided in step 403 whether resume control to be described later is currently performed. When a negative decision is made in step 403, it is decided in step 407 whether the resume switch 14b is turned on. When a negative decision is also made in step 407, it is decided in step 408 whether flags FACC and FCOA are turned on. When a negative decision is made in step 408, the flag FSET is turned off (step 409) and processing progresses from step 400 to step 105. Then, the processing in step 300 is executed again because the flag FPULL is turned on.

For the purpose that play is canceled and a substantial opening degree is early realized in the case of engine-racing control (step 300) as long as the idle switch 18 is turned on (step 301) as described above, the duty setting processing (step 303) for quickly rotating the throttle valve 26 to the open side is performed. The number of repetitions of the processing is counted by the counter PULLINT (step 304).

Then, it is decided whether the skip vehicle speed Vsk is equal to the storage vehicle speed Vm or higher (step 321). When Vsk≧Vm, the flag FPULL is turned off (step 322). Thereby, negative decision is made in the next control cycle in step 105 and duty arithmetic processing is performed (step 500). The skip vehicle speed Vsk and the processing in steps 321 and 322 are described later.

Thereafter, when the idle switch 18 is turned off, step 301 is executed and then it is decided whether the flag FPIDL is turned on (step 305). Because the flag FPIDL is turned on in up to the last control cycle in step 302, the value of the counter PULLINT showing the number of past fixed-duty outputs is input to a variable (idle value) IDL showing the play of the throttle valve 26 (step 306). Then, as shown in the following expression 2, the open-side driving value PULL for engine-racing control is recalculated in accordance with the storage vehicle speed Vm and the idle value IDL (step 307).

PULL←f(Vm)+IDL (Expression 2)

Then, the flag FPIDL is turned off (step 308), the counter PULLINT is counted up (step 309), the open-side duty cycle is set to 95% (step 310), and it is decided whether PULLINT≧PULL (step 311). Because the open-side driving value PULL is larger than the counter PULLINT by the value "f(Vm)−1" at first, a negative decision is made in step 311 and the throttle valve 26 is quickly controlled to the open side at the duty cycle of 95% by the processing in the next step 106. Therefore, as long as PULLINT<PULL (accurately, up to PULLINT=PULL), the throttle valve 26 is rotated to the open side at a high speed and the throttle valve quickly opens. That is, engine output is quickly increased to realize the storage vehicle speed Vm set in step 202 so that vehicle speed drop is minimized until the actuator 22 realizes the throttle opening degree for achieving the storage vehicle speed Vm.

When the inequality "PULLINT≧PULL" is satisfied as the result of the counting-up by PULLINT (step 309), an affirmative decision is made in step 311 and the flag FPULL is turned off (step 312). Thereby, a negative decision is made in the next control cycle in step 105 and duty arithmetic processing (step 500) is performed.

Thus, as long as the idle switch 18 is turned on (step 301:YES), the open-side duty cycle is set to 95% (step 303). Moreover, the open-side duty cycle is set to 95% even if the idle switch 18 is turned off (step 310). Therefore, when a negative decision is made in step 311, the throttle valve 26 is quickly controlled to the open side at the duty cycle of 95% by the processing in the next step 106 as long as a negative decision is made in the next step 321. Therefore, the throttle valve 26 is rotated to the open side at a high speed and the throttle quickly opens. That is, engine output is quickly increased to realize the storage vehicle speed Vm set in step 202 so that vehicle speed drop is minimized until the actuator 22 has the throttle opening degree for achieving the storage vehicle speed Vm.

However, when an affirmative decision is made in step 321, that is, when Vsk>Vm, engine-racing control is stopped even if conditions other than the above condition are effected because the flag FPULL is turned off in step 322.

Figure 7:
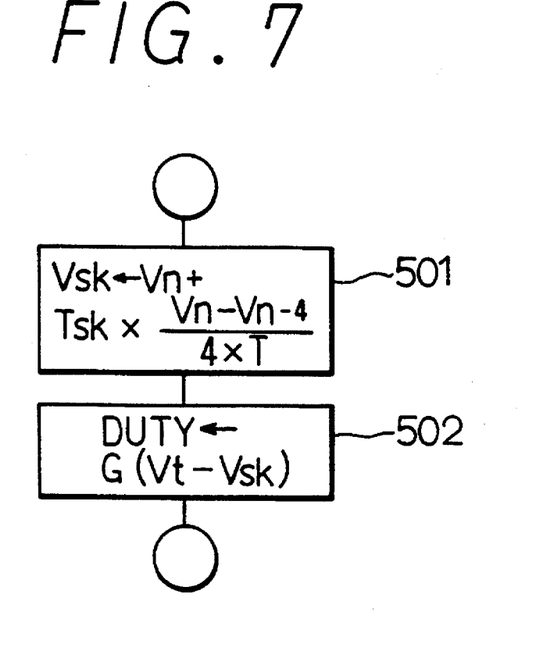
FIG. 7 is a flow chart showing the duty arithmetic processing in the flow chart of FIG. 2.

FIG. 7 shows details of the duty arithmetic processing (step 500). First, the skip vehicle speed (Vsk) serving as an advanced vehicle speed is obtained from the following expression 3 in accordance with present vehicle speed Vn, skip time Tsk, and vehicle speed differentiated value (actually, the differentiated value is obtained by dividing the difference between present vehicle speed Vn and the vehicle speed $V_{(n-4)}$ four control cycles before by the time for four control cycles).

$$Vsk \leftarrow Vn+Tsk\times(Vn-V_{(n-4)})/4T \qquad \text{(Expression 3)}$$

That is, Vsk is an estimated value of a vehicle speed after the skip time Tsk i.e., a present duration and has an advanced phase relative to the present traveling vehicle speed.

Figure 9:
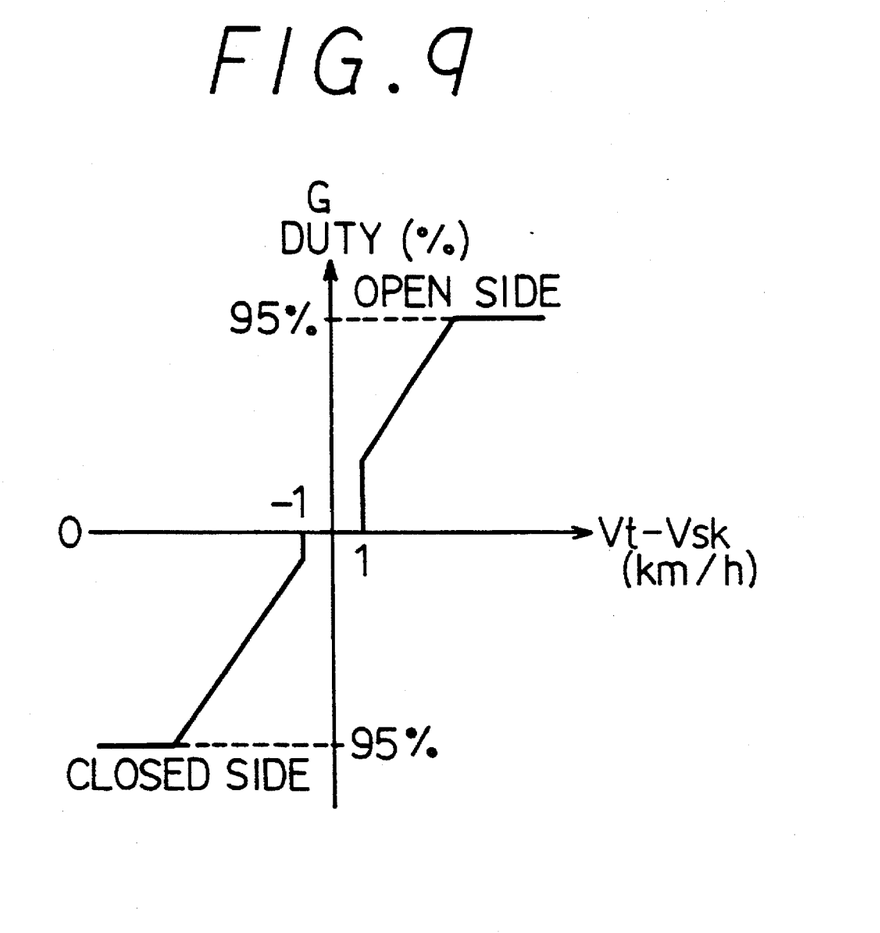
FIG. 9 is a map for calculating duty from the deviation between target vehicle speed Vt and skip vehicle speed Vsk.

Then, the processing in step 502 is started to calculate the duty cycle DUTY for driving the motor 22a with the deviation (Vt-Vsk: km/h) obtained by subtracting the skip vehicle speed Vsk from the target vehicle speed Vt in accordance with the map G shown in FIG. 9. As the duty cycle DUTY increases, the rotational speed of the motor 22a increases and thereby the throttle valve 26 is rotated at higher speed. This is shown by the following mathematical expression 4.

$$DUTY \leftarrow G(Vt-Vsk) \qquad \text{(Expression 4)}$$

The throttle open-side is entered at the upper part of the x axis and the throttle closed-side is entered at the lower part of it. The largest values of the open and closed sides are both set to the duty cycle of 95%. Moreover, a dead zone is provided between an area with a deviation of less than 1 and an area with a deviation of more than -1. The dead zone shows a state in which the throttle opening degree is not changed by decreasing an output to the motor 22a to the duty cycle DUTY of 0%. This is used to prevent a driving output to the motor 22a of the actuator 22 from being repeated.

Because the map G is established as described above, when Vt-Vsk≧1, the output duty cycle to the open side increases more the larger the deviation becomes, with an upper limit of 95%. That is, the larger is the deviation, the faster grows the throttle opening degree toward the open side.

Additionally, when Vt-Vsk≦-1, output duty cycle to closed side increases more the smaller the deviation becomes, with an upper limit of 95%. That is, the smaller is the deviation, the faster grows the throttle opening degree toward the closed side.

Subsequently, unless any condition is changed, the processing in steps 101, 102, 103, 104, 108, 109, 401, 403, 407, 408, 409, 105, 501, 502, and 106 are repeatedly executed every control cycle, the vehicle speed Vn is feedback-controlled so that it comes to the target vehicle speed, and cruise control is achieved.

Then, the cancel processing is described below. The cancel processing is a processing (step 600) for stopping cruise control when the cancel switch 14c of the control switch 14 is pressed during the cruise control (step 108) or when the stop lamp switch 16 is turned on when a brake is depressed (step 109).

Figure 8:
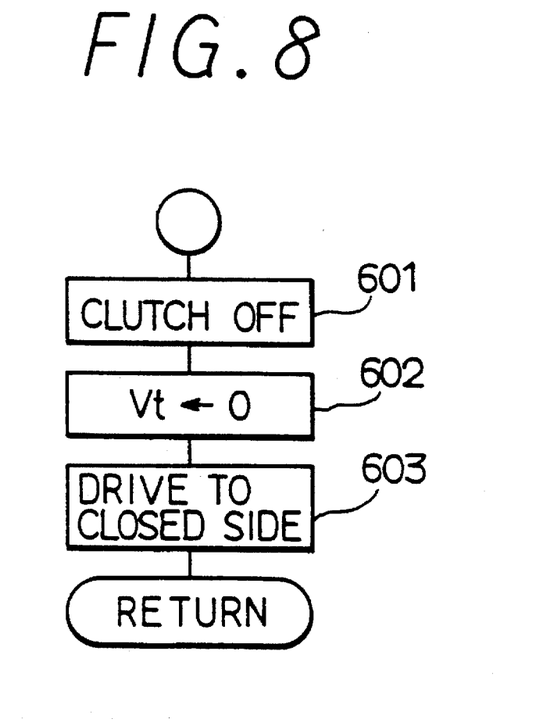
FIG. 8 is a flow chart showing the cancel processing in the flow chart of FIG. 2.

FIG. 8 shows details of the cancel processing. First, the clutch 22b is turned off (step 601), the target vehicle speed Vt is zero-cleared (step 602), and the motor 22a is continuously electrified to the closed side (step 603) to fully close the actuator 22. In this case, the storage vehicle speed Vm is left as it is without zero-clearing it.

Then, the resume processing is described below. The resume processing returns the present vehicle speed to the storage vehicle speed Vm when the resume switch 14b is pressed in a state where cruise control is not in progress and the storage vehicle speed Vm is stored.

First, it is decided in step 104 that control is not currently performed and then, the processing in step 200 is started. When the set switch 14a is turned off in step 201, it is decided whether the resume switch 14b is turned on or off (step 208). When the resume switch 14b is turned on and moreover unless the storage vehicle speed Vm is zero, that is, if the storage vehicle speed Vm is stored (step 209), the present vehicle speed Vn is set to the target vehicle speed Vt, the clutch 22b is turned on, and a flag FRES showing "under resume control" is turned on (step 210). Then, the processing in steps 105, 500, and 106 are executed.

In the next control cycle, a affirmative decision is made in step 104, step 400 is started through steps 108 and 109, negative decision is made in step 401, a and it is decided whether resume control is performed or not (step 403). That is, it is decided whether the flag FRES is turned on. When affirmative decision is made in step 403, the target vehicle speed Vt is increased by a certain vehicle speed D (step 404). Then, it is decided whether the target vehicle speed Vt is higher than the storage vehicle speed Vm or not (step 405). If Vt≦Vm, the processing in the next steps 105, 500, and 106 are executed. Therefore, as long as the inequality "Vt≦Vm" is effected, the processing in steps 105, 500, and 106 are executed while slowly increasing the target vehicle speed Vt to increase the vehicle speed Vn. When the inequality "Vt>Vm" is effected as the result of increasing the target vehicle speed Vt in step 404, the storage vehicle speed Vm is set to the target vehicle speed Vt and the flag FRES is turned off (step 406).

In the next control cycle, because a negative decision is made in step 403 and the resume switch 14b is already turned off, a negative decision is made when it is decided in the next step 407 whether the resume switch 14b is turned on and also a negative decision is made when it is decided in step 408 whether the flag FACC or FCOA is turned on. The flag FSET is turned off in step 409 and then steps 105, 500, and 106 are executed to perform cruise control.

Then, the accelerator processing is described below. The accelerator processing performs acceleration control when the resume switch 14b is pressed during cruise control and thereafter starts cruise control by assuming the vehicle speed Vn when the resume switch 14b is released as the target vehicle speed Vt. It is decided in step 104 that cruise control is currently performed and processing shifts from step 401 to step 403. When it is decided in the step 403 that resume control is not currently performed, it is decided in step 407 that the resume switch 14b is turned on if the resume switch 14b is already turned on. Thereby, the target vehicle speed Vt is increased by the vehicle speed D and the flag FACC showing that acceleration control is currently performed is turned on (step 410). Thereafter, in step 500, the driving duty cycle of the motor 22a is calculated by using the target vehicle speed Vt increased by the vehicle speed D to control the vehicle speed Vn so that it becomes equal to the increased target vehicle speed Vt. Thereby, acceleration control is achieved. As long as the resume switch 14b is continuously pressed, the target vehicle speed Vt increases by setting a predetermined speed such as a legal speed as an upper limit and the vehicle speed Vn is increased.

To end the accelerator control, it is only necessary to release the resume switch 14b. In this case, a negative decision is made in step 407, an affirmative decision is made in step 408 because the flag FACC is turned on, the present vehicle speed Vn is set to the storage vehicle speed Vm and target vehicle speed Vt, and moreover the flags FACC and FCOA are turned off (step 411). Thus, cruise control is started.

Then, the coast processing is described. The coast processing performs deceleration control when the set switch 14a is pressed during cruise control and thereafter starts cruise control by assuming the vehicle speed Vn when the set switch 14a is released as the target vehicle speed Vt. When it is decided in step 104 that cruise control is currently performed and moreover it is decided in step 401 that the set switch 14a is turned on, the processing in step 402 is performed. However, because the flag FSET is turned off in step 409, a negative decision is made in step 402 and the processing in step 412 is started. In step 412, a fixed duty cycle (e.g. 30%) for driving the motor 22a to the closed side is output and flag FCOA showing that coast control is currently performed is turned on. The duty cycle is output in step 106 and the next control cycle is started. It is decided in step 106 whether the flag FSET is turned on in order to separate the fact that the set switch 14a is turned on to perform cruise control from the fact that the set switch 14a is turned on to perform coast control.

When ending the coast control, the set switch 14a is released. Therefore, processing shifts from step 401 to step 408 through steps 403 and 407. In this case, because the flag FCOA is turned on, the present vehicle speed Vn is set to the storage vehicle speed Vm and target vehicle speed Vt in step 411 and moreover the flags FACC and FCOA are turned off (step 411. Thus, cruise control is started.

Cruise control is executed as described above and engine-racing control is performed at the start of cruise control. The engine-racing control (Step 301 to Step 312) is stopped when the skip vehicle speed Vsk is higher than the storage vehicle speed Vm (Step 321: YES) even if conditions other than the above condition are effected. For example, on a downward slope where a vehicle is naturally accelerated due to gravitational acceleration, the vehicle is excessively accelerated by engine-racing control same as that on a flat road. However, this embodiment makes it possible to avoid the trouble.

That is, though a vehicle is naturally accelerated on a downward slope due to gravitational acceleration, it is possible to stop engine-racing control early compared to the case in which the vehicle travels on a flat road and to avoid excessive acceleration of the vehicle because the above state is reflected on a comparative vehicle speed (the skip vehicle speed Vsk for this embodiment) which is based on the detected vehicle speed Vn.

Therefore, it is possible to prevent a vehicle speed from greatly deviating from a target speed by executing "engine-racing control" properly corresponding to the difference of road condition between a flat road and a downward slope and further improve the driving feeling and the comfort.

Moreover, in the case of a vehicle using a system which performs engine-racing control while an idle switch is turned on in order to compensate the play of a throttle linkage after setting cruise control by estimating that a throttle is at the fully closed position when the idle switch is turned on, the vehicle may abnormally be accelerated if the idle switch is broken down and the engine-racing control is not completed. Furthermore, in the case of a vehicle using a system for performing engine-racing control up to a certain throttle opening degree, the vehicle may abnormally be accelerated even when throttle-opening-degree detection means is broken down. When applying the present invention to a system for determining the controlled variable of engine-racing control in accordance with information other than vehicle speed as described above, it is possible to forcibly complete the engine-racing control when the vehicle speed increases. Therefore, the present invention makes it possible to securely prevent an abnormal acceleration and also serves as effective fail-safe means.

In the above embodiment, steps 501 and 502 correspond to the processing performed by driving-force control means, steps 301 to 312 correspond to the processing performed by engine-racing control means, and steps 321 and 322 correspond to the processing performed by engine-racing control stop means.

In the above embodiment, the flag FPULL is turned off to stop engine-racing control in accordance with the decision in Step 321 in FIG. 5 when Vsk>Vm. It is also possible to decide whether the inequality "Vsk>Vm+a" is satisfied by adding the predetermined value "a" to the storage vehicle speed Vm as a comparative object of the skip vehicle speed Vsk instead of using only storage vehicle speed Vm. Moreover, it is possible to compare the present vehicle speed Vn with the storage vehicle speed Vm or with a value obtained by adding the predetermined value "a" to the storage vehicle speed Vm. Furthermore, it is possible to change the predetermined value "a" for the engine-racing control for setting (e.g. 1 km/h) and the engine-racing control after temporary acceleration (e.g. 2 km/h).

However, the skip vehicle speed Vsk is obtained from the above expression 3 in accordance with the present vehicle speed Vn, skip time Tsk, and vehicle speed differentiated value. That is, the skip vehicle speed Vsk is a value obtained by estimating a vehicle speed after the skip time Tsk and has an advanced phase relative to the present traveling vehicle speed. Therefore, when performing the same engine-racing control on a flat road and a downward slope, the skip vehicle speed Vsk greatly differs between both engine-racing controls. That is, the skip vehicle speed Vsk on the downward slope early becomes higher than the storage vehicle speed Vm and therefore it is possible to early decide the state in which engine-racing control should be stopped. Therefore, there is an advantage that excessive acceleration can more securely be avoided by early stopping engine-racing control on a downward slope.

The above embodiment is applied to engine-racing control at start of cruise control. However, the embodiment can be applied to not only start of cruise control but also the case in which engine-racing control is performed when temporary acceleration is performed during cruise control and thereafter, cruising at the target speed is restarted. When performing "engine-racing control" after temporary acceleration is completed, it is possible to prevent an undershoot on a flat road. When performing the same engine-racing control on a downward slope, however, vehicle speed is increased before it is decreased to a target speed because a vehicle is naturally accelerated due to gravitational acceleration. Therefore, the problem also occurs that the driving feeling is impaired or the comfort is deteriorated.

Thus, also in this case, it is possible to prevent that vehicle speed is increased before it is decreased to the target speed by stopping engine-racing control when, for example, the skip vehicle speed Vsk becomes higher than the storage vehicle speed Vm even if conditions other than the above condition are effected and improve the driving feeling and the comfort.

Moreover, it is possible to perform the same engine-racing control in order to prevent an undershoot after coast (deceleration) control and at start of resume control. However, the engine-racing control at start of resume control uses the vehicle speed when turning on a resume switch instead of the storage vehicle speed Vm as a comparative object of the skip vehicle speed Vsk (or the present vehicle speed Vn).

What is claimed is:

1. A constant-speed cruise control apparatus for providing cruise control to a vehicle, provided with vehicle speed detecting means for detecting a traveling vehicle speed of a vehicle, and driving-force control means for controlling a driving-force adjustment system for adjusting the driving force of an engine so as to adjust the traveling vehicle speed detected by said vehicle speed detection means to a target traveling speed in accordance with deviation between the traveling vehicle speed and the target traveling speed, comprising:

acceleration correction means for temporarily driving the driving-force adjustment system to an acceleration position during cruise control; and acceleration correction stop means for comparing a comparative vehicle speed which is based on said traveling vehicle speed detected by said vehicle speed detection means with the target traveling speed and stopping the temporary driving of said driving-force adjustment system to said acceleration position when the comparative vehicle speed is higher than the target traveling speed.

2. A constant-speed cruise control apparatus for a vehicle according to claim 1, further comprising advanced vehicle speed calculation means for calculating as said comparative vehicle speed an advanced vehicle speed whose phase advances relative to that of the traveling vehicle speed detected by the vehicle speed detection means.

3. A constant-speed cruise control apparatus for a vehicle according to claim 2, wherein said advanced vehicle speed calculation means calculates an estimated vehicle speed after a predetermined time by adding a latest vehicle speed detected by said vehicle speed detection means and a vehicle speed obtained by multiplying a vehicle speed differentiated value computed in accordance with at least the latest vehicle speed by the predetermined time, the estimated vehicle speed being used as the comparative vehicle speed.

4. A constant-speed cruise control apparatus for a vehicle according to claim 1, wherein the acceleration correction means temporarily drives the driving-force adjustment system to the acceleration position when at least one of the following occurs: (1) when cruise control is started and (2) when cruising at the target traveling speed is restarted after temporary acceleration is performed during cruise control.

5. A constant-speed cruise control apparatus for a vehicle according to claim 1, wherein the acceleration correction stop means uses a vehicle speed obtained by adding a predetermined value to the target traveling speed as a new target traveling speed.

6. A constant-speed cruise control apparatus for a vehicle according to claim 5, wherein the acceleration correction means temporarily drives the driving-force adjustment system to the acceleration position when cruise control is started and when cruising at the target traveling speed is restarted after temporary acceleration is performed during cruise control, and the acceleration correction stop means sets the predetermined value so that the predetermined value becomes larger when acceleration correction occurs after the temporary acceleration than when acceleration correction occurs at the start of cruise control.

7. A constant-speed cruise control apparatus for a vehicle according to claim 1, wherein the driving-force adjustment system is provided with a throttle valve installed to an intake pipe of an engine, and the acceleration correction means temporarily drives the throttle valve to an open position when the throttle valve is fully closed.

8. A constant-speed cruise control apparatus for a vehicle according to claim 7, wherein the acceleration correction means temporarily drives the throttle valve to the open position until the throttle valve reaches an opening degree obtained by adding a throttle-valve opening degree corresponding to the target traveling speed and the valve play when the throttle valve rotates.

* * * * *